US011299669B2

(12) United States Patent
Shin et al.

(10) Patent No.: US 11,299,669 B2
(45) Date of Patent: Apr. 12, 2022

(54) COLOR CONVERSION FILM, METHOD FOR PRODUCING SAME, BACK-LIGHT UNIT AND DISPLAY APPARATUS

(71) Applicant: LG CHEM, LTD., Seoul (KR)

(72) Inventors: Dong Mok Shin, Daejeon (KR); Sehwan Son, Daejeon (KR); Hoyong Lee, Daejeon (KR); Byeong In Ahn, Daejeon (KR); Du Hyeon Shin, Daejeon (KR); Nari Kim, Daejeon (KR); Ji Ho Kim, Daejeon (KR); Joo Yeon Seo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 532 days.

(21) Appl. No.: 15/532,017

(22) PCT Filed: Feb. 1, 2016

(86) PCT No.: PCT/KR2016/001087
§ 371 (c)(1),
(2) Date: May 31, 2017

(87) PCT Pub. No.: WO2016/122283
PCT Pub. Date: Aug. 4, 2016

(65) Prior Publication Data

US 2017/0267921 A1 Sep. 21, 2017

(30) Foreign Application Priority Data

Jan. 31, 2015 (KR) ........................ 10-2015-0015707

(51) Int. Cl.
*C09K 11/06* (2006.01)
*C09K 11/02* (2006.01)
(Continued)

(52) U.S. Cl.
CPC ............ *C09K 11/025* (2013.01); *C09K 11/06* (2013.01); *G02F 1/133621* (2013.01);
(Continued)

(58) Field of Classification Search
CPC .............................. C09K 11/06; C09K 11/025
See application file for complete search history.

(56) References Cited

U.S. PATENT DOCUMENTS

2003/0082406 A1* 5/2003 Murase ................... C07F 5/022 428/690
2010/0264406 A1* 10/2010 Nagao .................. C07D 207/44 257/40

(Continued)

FOREIGN PATENT DOCUMENTS

CN 101393970 A 3/2009
CN 103025831 A 4/2013

(Continued)

OTHER PUBLICATIONS

Chen. Bright White Polymer double-layer LEDS. Polymer Preprints 2000, 47(1), 835 (Year: 2000).*

(Continued)

*Primary Examiner* — Matthew E. Hoban
(74) *Attorney, Agent, or Firm* — Dentons US LLP

(57) ABSTRACT

The invention described in the present specification relates to a color conversion film including a resin matrix; and an organic fluorescent substance dispersed in the resin matrix, and absorbing blue or green light and emitting light having a wavelength different from the absorbing light, wherein the resin matrix includes a thermoplastic resin, and the color conversion film has a light emission peak with a FWHM of 60 nm or less, quantum efficiency of 80% or greater and an absorption coefficient of 30,000 $M^{-1}cm^{-1}$ or greater at a maximum absorption wavelength when irradiating light (Continued)

having a light emission peak at 450 nm, a FWHM of 40 nm or less and monomodal light emission intensity distribution, a method for preparing the same, and a backlight unit including the color conversion film.

8 Claims, 3 Drawing Sheets

(51) Int. Cl.
*G02F 1/13357* (2006.01)
*G02F 1/1335* (2006.01)

(52) U.S. Cl.
CPC ................ *C09K 2211/1007* (2013.01); *C09K 2211/1011* (2013.01); *C09K 2211/1055* (2013.01); *G02F 1/133614* (2021.01); *G02F 1/133624* (2021.01)

(56) References Cited

U.S. PATENT DOCUMENTS

| | | | | |
|---|---|---|---|---|
| 2012/0229017 | A1 | 9/2012 | Nagai et al. | |
| 2013/0137018 | A1 | 5/2013 | Arayama et al. | |
| 2013/0265522 | A1 | 10/2013 | Jung et al. | |
| 2013/0334546 | A1* | 12/2013 | Wagenblast | F21V 9/38 257/88 |
| 2016/0011355 | A1 | 1/2016 | Kokudo et al. | |
| 2016/0284947 | A1 | 9/2016 | Koenemann et al. | |

FOREIGN PATENT DOCUMENTS

| | | | |
|---|---|---|---|
| DE | 4310082 | * | 3/1993 |
| JP | H09289081 | * | 11/1997 |
| JP | 2009-23914 | A | 2/2009 |
| JP | 2011-241160 | A | 12/2011 |
| KR | 10-2008-0064099 | A | 7/2008 |
| KR | 10-2014-0051214 | A | 4/2010 |
| KR | 10-2012-0071388 | A | 7/2012 |
| KR | 10-2013-0112990 | A | 10/2013 |
| WO | 2014/132726 | A1 | 9/2014 |

OTHER PUBLICATIONS

Machine Translation of DE4310082A1. Retrieved from Google patents on Dec. 23, 2020 from https://patents.google.com/patent/DE4310082A1/en (Year: 1993).*

Machine translation of JP-H09289081. Retrieved from google patents on Dec. 23, 2020 from https://patents.google.com/patent/JPH09289081A/en?oq=JP-H09289081 (Year: 1996).*

Kuznetsova. Lasing characteristics of difluoroborates of 2,2'-dipyrromethene derivatives in solid matrices. 2014 Quantum Electron. 44 206 (Year: 2014).*

Perez-Ojeda. Unprecedented solid-state laser action from BODIPY dyes under UV-pumping radiation.Appl Phys B (2012) 106:911-914 (Year: 2012).*

Garcia-Moreno. Structural changes in the BODIPY dye PM567 Enhancing the Laser Action in Liquid and Solid Media. Adv. Funct. Mater. 2007, 17, 3088-3098 (Year: 2007).*

* cited by examiner

[FIG. 1]
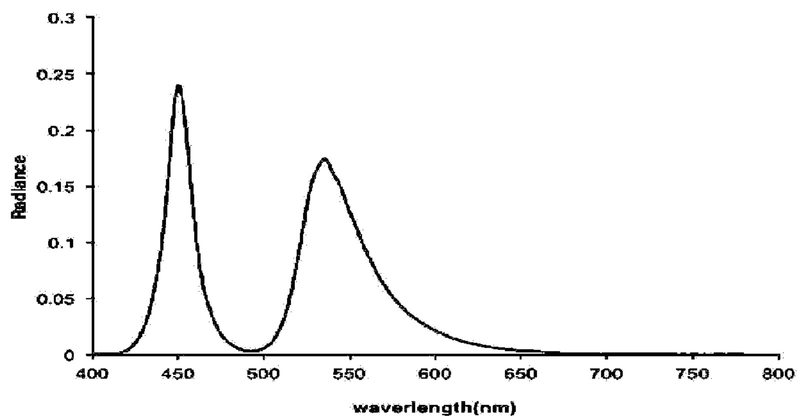
[FIG. 2]
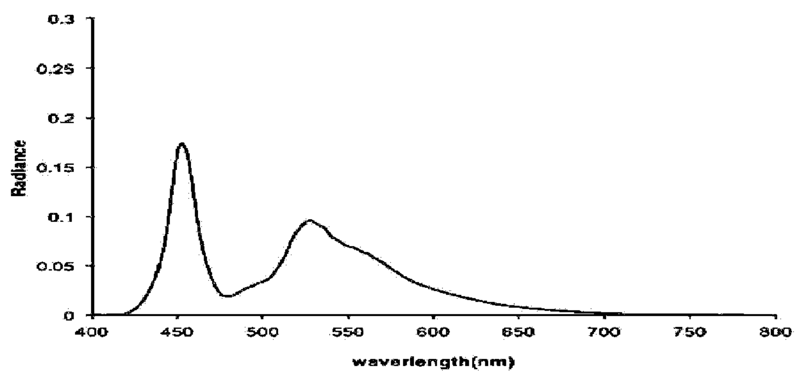
[FIG. 3]
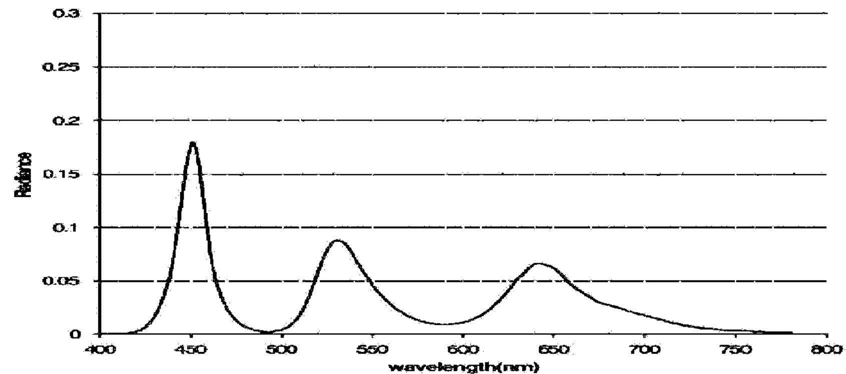

[FIG. 4]
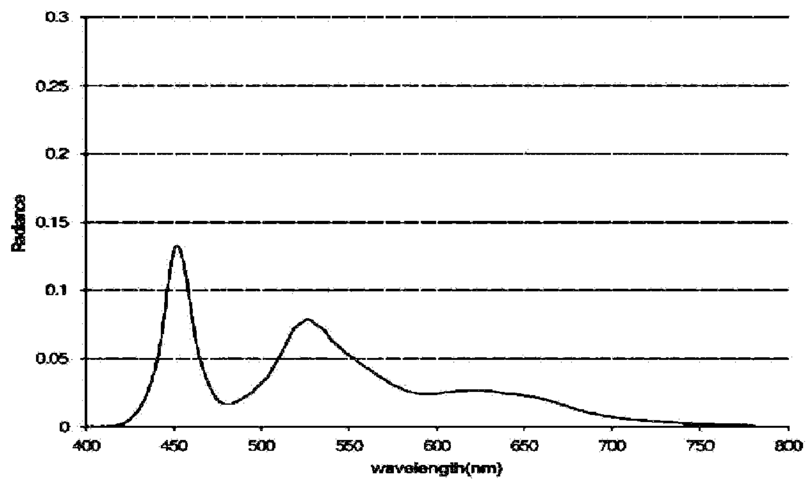
[FIG. 5]
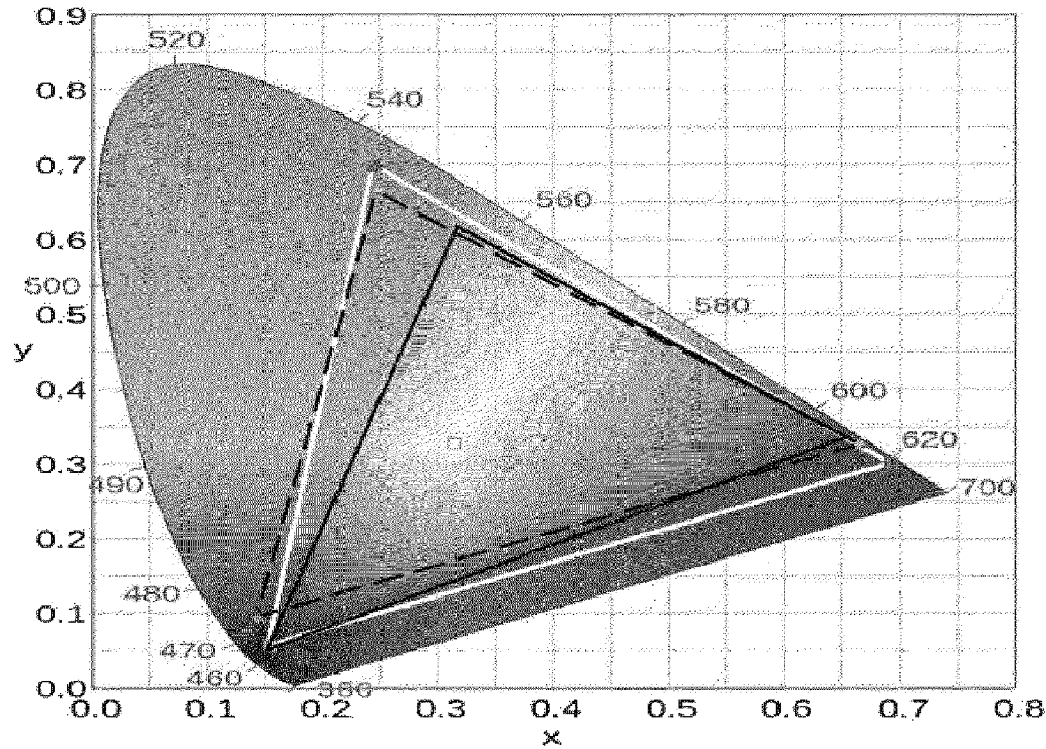

[FIG. 6]
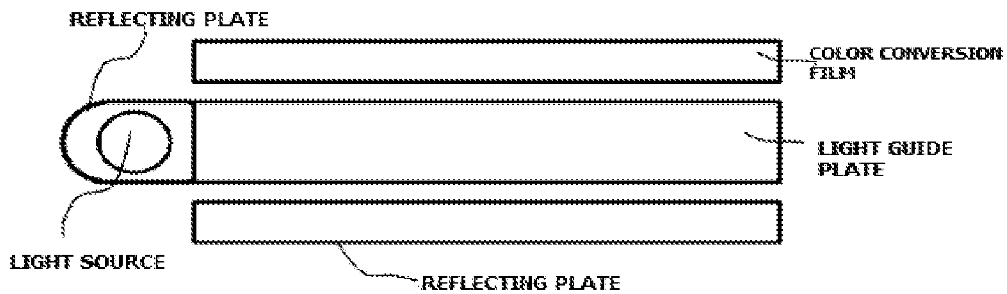
[FIG. 7]
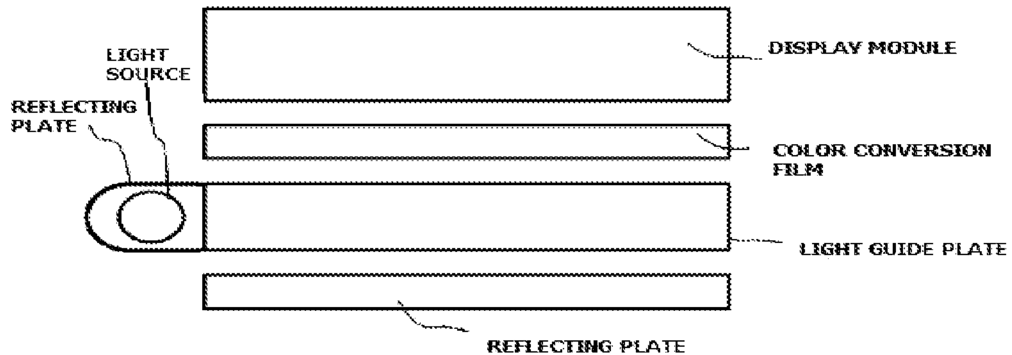
[FIG. 8]
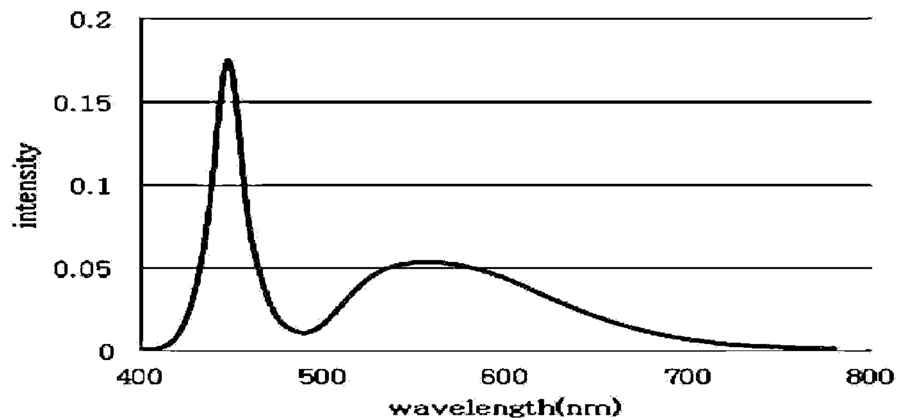

COLOR CONVERSION FILM, METHOD FOR PRODUCING SAME, BACK-LIGHT UNIT AND DISPLAY APPARATUS

This application is a National Stage Application of International Application No. PCT/KR2016/001087 filed on Feb. 1, 2016, which claims the benefit of Korean Patent Application No. 10-2015-0015707 filed on Jan. 31, 2015, all of which are hereby incorporated by reference in their entirety for all purposes as if fully set forth herein.

TECHNICAL FIELD

The present application relates to a color conversion film and a method for preparing the same. In addition, the present application relates to a backlight unit and a display apparatus including the color conversion film.

The present application claims priority to and the benefits of Korean Patent Application No. 10-2015-0015707, filed with the Korean Intellectual Property Office on Jan. 31, 2015, the entire contents of which are incorporated herein by reference.

BACKGROUND ART

As large area televisions become more common, televisions are also becoming high-definition, slimmer and highly functional. High performance and high definition OLED TVs still have a problem of price competitiveness, and real markets for OLED Tvs have not yet begun. Accordingly, efforts to similarly secure advantages of OLEDs with LCDs have been continuously made.

As one of the efforts, many quantum dot-related technologies and prototypes have been recently incorporated. However, cadmium-based quantum dots have safety problems such as restrictions on the use, and therefore, interests in manufacturing back lights using quantum dots without cadmium, which has relatively no safety issues, has been rising.

DISCLOSURE

Technical Problem

The present application provides a color conversion film having excellent color gamut and a luminance property, a method for preparing the same, and a back light unit and a display apparatus including the color conversion film.

Technical Solution

One embodiment of the present application provides a color conversion film including a resin matrix; and an organic fluorescent substance dispersed in the resin matrix, and absorbing blue or green light and emitting light having a wavelength different from the absorbing light, wherein the resin matrix includes a thermoplastic resin, and the color conversion film has a light emission peak with a full width at half maximum (FWHM) of 60 nm or less, quantum efficiency of 80% or greater and an absorption coefficient of 30,000 $M^{-1}cm^{-1}$ or greater at a maximum absorption wavelength when irradiating light having a light emission peak at 450 nm, a FWHM of 40 nm or less and monomodal light emission intensity distribution.

According to another embodiment of the present application, in the embodiment described above, the organic fluorescent substance includes one, two or more types of organic fluorescent substances having a maximum light emission peak in a 510 nm to 680 nm range when irradiating light having a light emission peak at 450 nm, a FWHM of 40 nm or less and monomodal light emission intensity distribution.

Another embodiment of the present application provides a method for preparing a color conversion film having a light emission peak with a FWHM of 60 nm or less, quantum efficiency of 80% or greater and an absorption coefficient of 30,000 $M^{-1}cm^{-1}$ or greater at a maximum absorption wavelength when irradiating light having a light emission peak at 450 nm, a FWHM of 40 nm or less and monomodal light emission intensity distribution, the method including coating a thermoplastic resin solution in which an organic fluorescent substance is dissolved on a substrate; and drying the thermoplastic resin solution coated on the substrate.

Another embodiment of the present application provides a method for preparing a color conversion film having a light emission peak with a FWHM of 60 nm or less, quantum efficiency of 80% or greater and an absorption coefficient of 30,000 $M^{-1}cm^{-1}$ or greater at a maximum absorption wavelength when irradiating light having a light emission peak at 450 nm, a FWHM of 40 nm or less and monomodal light emission intensity distribution, the method including extruding an organic fluorescent substance with a thermoplastic resin.

Another embodiment of the present application provides a backlight unit including the color conversion film.

According to another embodiment of the present application, the backlight unit includes one or more of the color conversion films described above, and may further include a color conversion film having a light emission peak with a FWHM of greater than 60 nm when irradiating light having a light emission peak at 450 nm, a FWHM of 40 nm or less and monomodal light emission intensity distribution. Herein, at least one of the color conversion films has a maximum light emission wavelength in a 600 nm to 680 nm range when irradiating light having a light emission peak at 450 nm, a FWHM of 40 nm or less and monomodal light emission intensity distribution, and at least one of the color conversion films has a maximum light emission wavelength in a 515 nm to 555 nm range when irradiating light having a light emission peak at 450 nm, a FWHM of 40 nm or less and monomodal light emission intensity distribution.

According to another embodiment of the present application, the backlight unit includes two or more of the color conversion films described above, and at least one of the color conversion films has a maximum light emission wavelength in a 600 nm to 680 nm range when irradiating light having a light emission peak at 450 nm, a FWHM of 40 nm or less and monomodal light emission intensity distribution, and at least one of the color conversion films has a maximum light emission wavelength in a 515 nm to 555 nm range when irradiating light having a light emission peak at 450 nm, a FWHM of 40 nm or less and monomodal light emission intensity distribution. Herein, the color conversion films all have a FWHM of 60 nm or less.

Another embodiment of the present application provides a display apparatus including the backlight unit.

Advantageous Effects

A color conversion film according to embodiments described in the present specification includes an organic fluorescent substance, and has a light emission peak with a FWHM of 60 nm or less, quantum efficiency of 80% or greater and an absorption coefficient of 30,000 $M^{-1}cm^{-1}$ or greater at a maximum absorption wavelength when irradiating light having a light emission peak at 450 nm, a FWHM of 40 nm or less and monomodal light emission intensity distribution, and therefore, has excellent environmental stability compared to existing color conversion films including cadmium series quantum dots, and also has greatly increased color gamut. In addition, the organic fluorescent substance included in the color conversion film described above is more resistant to oxidation caused by air or moisture compared to quantum dots, is capable of simplifying a film forming process, has excellent light emission efficiency compared to inorganic fluorescent substance series particles, and does not require particle pulverization or dispersion, and consequently, has an advantage of simplifying a film forming process. In addition, the color conversion film according to embodiments described in the present specification uses a thermoplastic resin as a matrix resin, and therefore, prevents degradation of a fluorescent substance caused by reactive radicals generated when using UV-curable resins, and is also capable of minimizing thickness variation after film formation since a solvent is used therewith and, even when coating uniformity decreases, sufficient leveling is obtained when drying the solvent.

DESCRIPTION OF DRAWINGS

FIG. 1 shows a light emission wavelength of a color conversion film prepared in Example 1.

FIG. 2 shows a light emission wavelength of a color conversion film prepared in Comparative Example 1.

FIG. 3 shows a light emission wavelength of a color conversion film prepared in Example 2.

FIG. 4 shows a light emission wavelength of a color conversion film prepared in Comparative Example 2.

FIG. 5 compares light emission color ranges of a color conversion film prepared in Example 1 and a color conversion film prepared in Comparative Example 1.

FIG. 6 is a mimetic diagram using a color conversion film according to one embodiment of the present application in a back light.

FIG. 7 is a mimetic diagram illustrating a structure of a display apparatus according to one embodiment of the present application.

FIG. 8 shows a luminance spectrum of a white LED BLU used in Comparative Example 3.

MODE FOR INVENTION

A color conversion film according to one embodiment of the present application includes a resin matrix; and an organic fluorescent substance dispersed in the resin matrix, and absorbing blue or green light and emitting light having a wavelength different from the absorbing light, wherein the resin matrix includes a thermoplastic resin, and the color conversion film has a light emission peak with a FWHM of 60 nm or less, quantum efficiency of 80% or greater and an absorption coefficient of 30,000 $M^{-1}cm^{-1}$ or greater at a maximum absorption wavelength when irradiating light having a light emission peak at 450 nm, a FWHM of 40 nm or less and monomodal light emission intensity distribution.

According to another embodiment of the present application, in the embodiment described above, the organic fluorescent substance includes an organic fluorescent substance having a maximum light emission peak in a 510 nm to 680 nm range when irradiating light having a light emission peak at 450 nm, a FWHM of 40 nm or less and monomodal light emission intensity distribution.

In the embodiment, the color conversion film has a light emission peak with a FWHM of 60 nm or less while having quantum efficiency of 80% greater and an absorption coefficient of 30,000 $M^{-1}cm^{-1}$ at a maximum absorption wavelength when irradiating light having a light emission peak at 450 nm, a FWHM of 40 nm or less and monomodal light emission intensity distribution, and therefore, color gamut as well as a luminance property of the color conversion film are greatly enhanced.

In addition, in the embodiment, an organic fluorescent substance is used, and therefore, environmental safety is capable of being improved since heavy metals used in quantum dots of cadmium, indium, zinc and the like or in inorganic-based fluorescent substances such as Eu or Sr are not used. In addition, quantum dots are vulnerable to oxidation by air or moisture, and thereby have a problem of a process being complicated and difficult, and inorganic-based fluorescent substances have relatively low light emission efficiency and complicated conditions of particle pulverization and dispersion, whereas, in the embodiment, stability for air or moisture is excellent since the organic fluorescent substance described above is used, and a film preparation process is capable of being simplified.

According to one example, the FWHM at light emission peak, the quantum efficiency, and the absorption coefficient at a maximum absorption wavelength may be measured after placing a prism sheet or a DBEF film on a film obtained by coating a resin solution in which an organic fluorescent substance is dissolved on a transparent substrate such as PET, and drying or curing the result. Herein, the prism sheet or the DBEF film is used for convenience, and it does not affect the values of the FWHM at light emission peak, the quantum efficiency, and the absorption coefficient at a maximum absorption wavelength.

In the present specification, a FWHM at light emission peak means a width of a light emission peak at a half of the maximum height in a maximum light emission peak of the light emitting from the color conversion film when irradiating light having a light emission peak at 450 nm, a FWHM of 40 nm or less and monomodal light emission intensity distribution on the color conversion film. The FWHM at light emission peak in the present specification is measured in a film state. The FWHM at light emission peak may be determined depending on types and compositions of components such as an organic fluorescent substance, a resin matrix or other additives included in the color conversion film. It is better as the color conversion film has a light emission peak with a smaller FWHM.

In the present specification, quantum efficiency may be measured using methods known in the art. For example, quantum efficiency (Qy) is defined by [number of emitted photons]/[number of absorbed photons] when irradiating light on a color conversion film, and herein, the "number of absorbed photons" is a value subtracting an amount of photons remaining after being absorbed through a color conversion film (amount of blue photons after absorption) based on an initial amount of photons (initial amount of blue photons) measured using a spectroradiometer (TOPCON Corporation) from a front direction in a blue LED back light (maximum light emission wavelength 450 nm), and the "number of emitted photons" is an amount of photons consumed in a green or red light emission form after the color conversion film is excited from receiving blue photons delivered from the back light.

In the present specification, an absorption coefficient at a maximum absorption wavelength may be measured and calculated known in the art. For example, an absorbance amount of a fluorescent dye solution with a known concentration absorbed at a specific wavelength (generally maximum absorption wavelength) is measured using a UV spectrophotometer, and an absorption coefficient may be calculated by evaluating an s value using Beer's Law (A=εbc).

According to one embodiment of the present application, the organic fluorescent substance may include an organic fluorescent substance absorbing blue or green light and emitting red light, an organic fluorescent substance absorbing blue light and emitting green light, or a mixture thereof. Specifically, the organic fluorescent substance includes an organic fluorescent substance having a maximum light emission wavelength in a 600 nm to 680 nm range or an organic fluorescent substance having a maximum light emission wavelength in a 515 nm to 555 nm range when irradiating light having a light emission peak at 450 nm, a FWHM of 40 nm or less and monomodal light emission intensity distribution, or a mixture thereof.

In the present specification, blue light, green light and red light may use definitions known in the art, and for example, blue light is light having a wavelength selected from wavelengths of 400 nm to 500 nm, green light is light having a wavelength selected from wavelengths of 500 nm to 560 nm, and red light is light having a wavelength selected from wavelengths of 600 nm to 780 nm. In the present specification, a green fluorescent substance absorbs at least some of blue light and emits green light, and a red fluorescent substance absorbs at least some of blue light or green light and emits red light. For example, a red fluorescent substance may absorb light having a wavelength of 500 nm to 600 nm as well as blue light.

According to one embodiment of the present application, an organic fluorescent substance having a maximum light emission wavelength in a 510 nm to 680 nm range when irradiating light having a light emission peak at 450 nm, a FWHM of 40 nm or less and monomodal light emission intensity distribution may be included as the organic fluorescent substance.

According to one embodiment of the present application, pyrromethene metal complex series organic fluorescent substances may be used as the organic fluorescent substance.

According to one example, organic fluorescent substances of the following Chemical Formula 1 may be used.

[Chemical Formula 1]

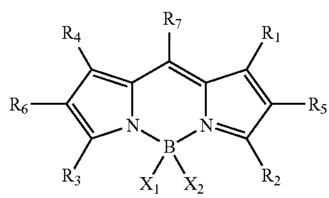

In Chemical Formula 1, $X_1$ and $X_2$ are a fluorine group or an alkoxy group, $R_1$ to $R_4$ are the same as or different from each other, and each independently hydrogen, a halogen group, an alkyl group, an alkoxy group, a carboxyl group-substituted alkyl group, an aryl group unsubstituted or substituted with an alkoxy group, —COOR or a —COOR-substituted alkyl group, and herein, R is an alkyl group, $R_5$ and $R_6$ are the same as or different from each other, and each independently hydrogen, a cyano group, a nitro group, an alkyl group, a carboxyl group-substituted alkyl group, —$SO_3$Na, or an aryl group unsubstituted or substituted with arylalkynyl, $R_1$ and $R_5$ may be linked to each other to form a substituted or unsubstituted hydrocarbon ring or a substituted or unsubstituted heteroring, and $R_4$ and $R_6$ may be linked to each other to form a substituted or unsubstituted hydrocarbon ring or a substituted or unsubstituted heteroring, and $R_7$ is hydrogen; an alkyl group; a haloalkyl group; or an aryl group unsubstituted or substituted with a halogen group, an alkyl group, an alkoxy group, an aryl group or an alkylaryl group.

According to one embodiment, $R_1$ to $R_4$ of Chemical Formula 1 are the same as or different from each other, and each independently hydrogen, a fluorine group, a chlorine group, an alkyl group having 1 to 6 carbon atoms, an alkoxy group having 1 to 6 carbon atoms, a carboxylic acid-substituted alkyl group having 1 to 6 carbon atoms, an aryl group having 6 to 20 carbon atoms unsubstituted or substituted with an alkoxy group having 1 to 6 carbon atoms, —COOR, or a —COOR-substituted alkyl group having 1 to 6 carbon atoms, and herein, R is an alkyl group having 1 to 6 carbon atoms.

According to another embodiment, $R_1$ to $R_4$ of Chemical Formula 1 are the same as or different from each other, and each independently hydrogen, a chlorine group, a methyl group, a carboxyl group-substituted ethyl group, a methoxy group, a phenyl group, a methoxy group-substituted phenyl group or a —COOR-substituted methyl group, and herein, R is an alkyl group having 1 to 6 carbon atoms.

According to one embodiment, $R_5$ and $R_6$ of Chemical Formula are the same as or different from each other, and each independently hydrogen, a nitro group, an alkyl group having 1 to 6 carbon atoms, a carboxyl group-substituted alkyl group having 1 to 6 carbon atoms, or —$SO_3$Na.

According to one embodiment, $R_5$ and $R_6$ of Chemical Formula are the same as or different from each other, and each independently hydrogen, a nitro group, an ethyl group, a carboxyl group-substituted ethyl group, or —$SO_3$Na.

According to one embodiment, $R_7$ of Chemical Formula 1 is hydrogen; an alkyl group having 1 to 6 carbon atoms; or an aryl group having 6 to 20 carbon atoms unsubstituted or substituted with an alkyl group having 1 to 6 carbon atoms, an alkoxy group having 1 to 6 carbon atoms, an aryl group having 6 to 20 carbon atoms or an alkylaryl group having 7 to 20 carbon atoms.

According to one embodiment, $R_7$ of Chemical Formula 1 is hydrogen, methyl, ethyl, propyl, butyl, pentyl, phenyl, methylphenyl, dimethylphenyl, trimethylphenyl, naphthyl, biphenyl-substituted naphthyl, dimethylfluorene-substituted naphthyl, terphenyl-substituted dimethylphenyl, methoxyphenyl or dimethoxyphenyl.

According to one embodiment, Chemical Formula 1 may be represented by the following structural formulae.

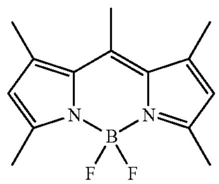

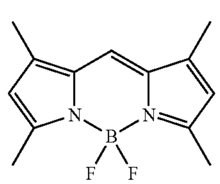

-continued
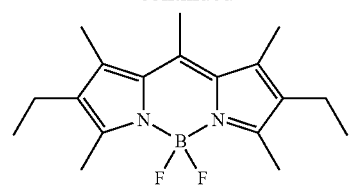
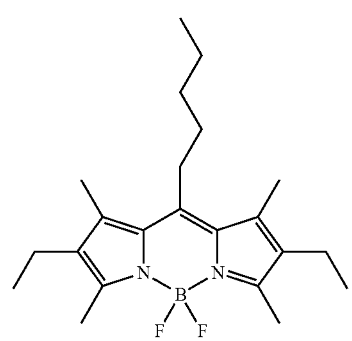
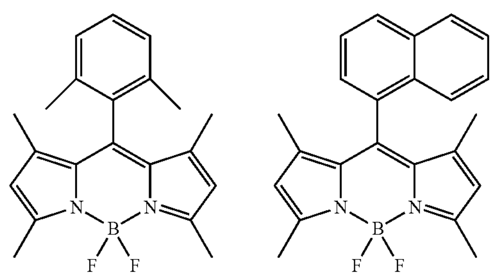
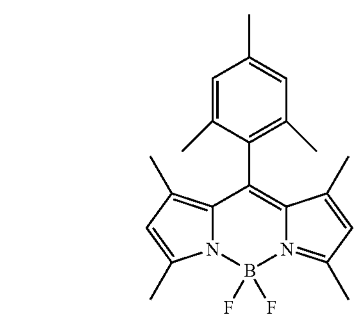
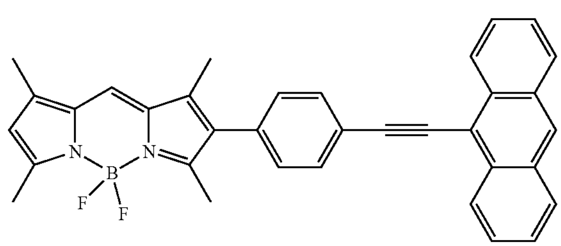
-continued
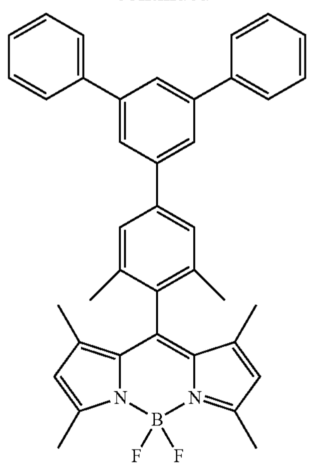
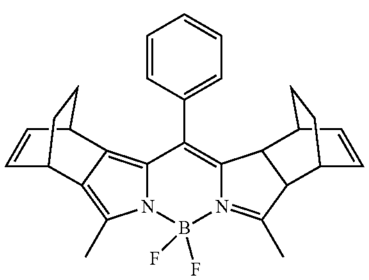
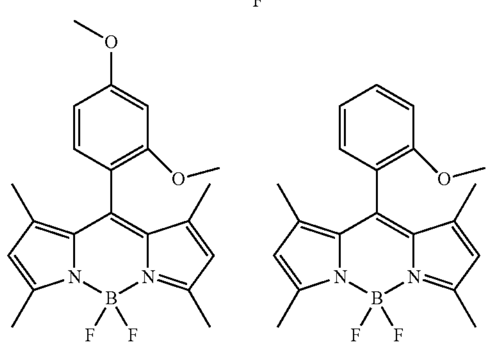
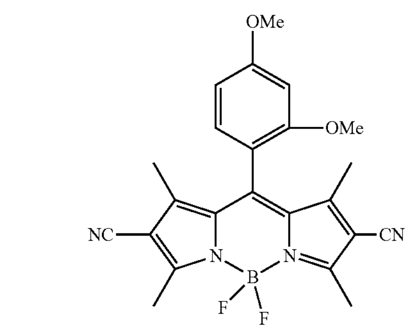
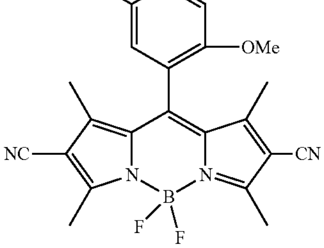

-continued

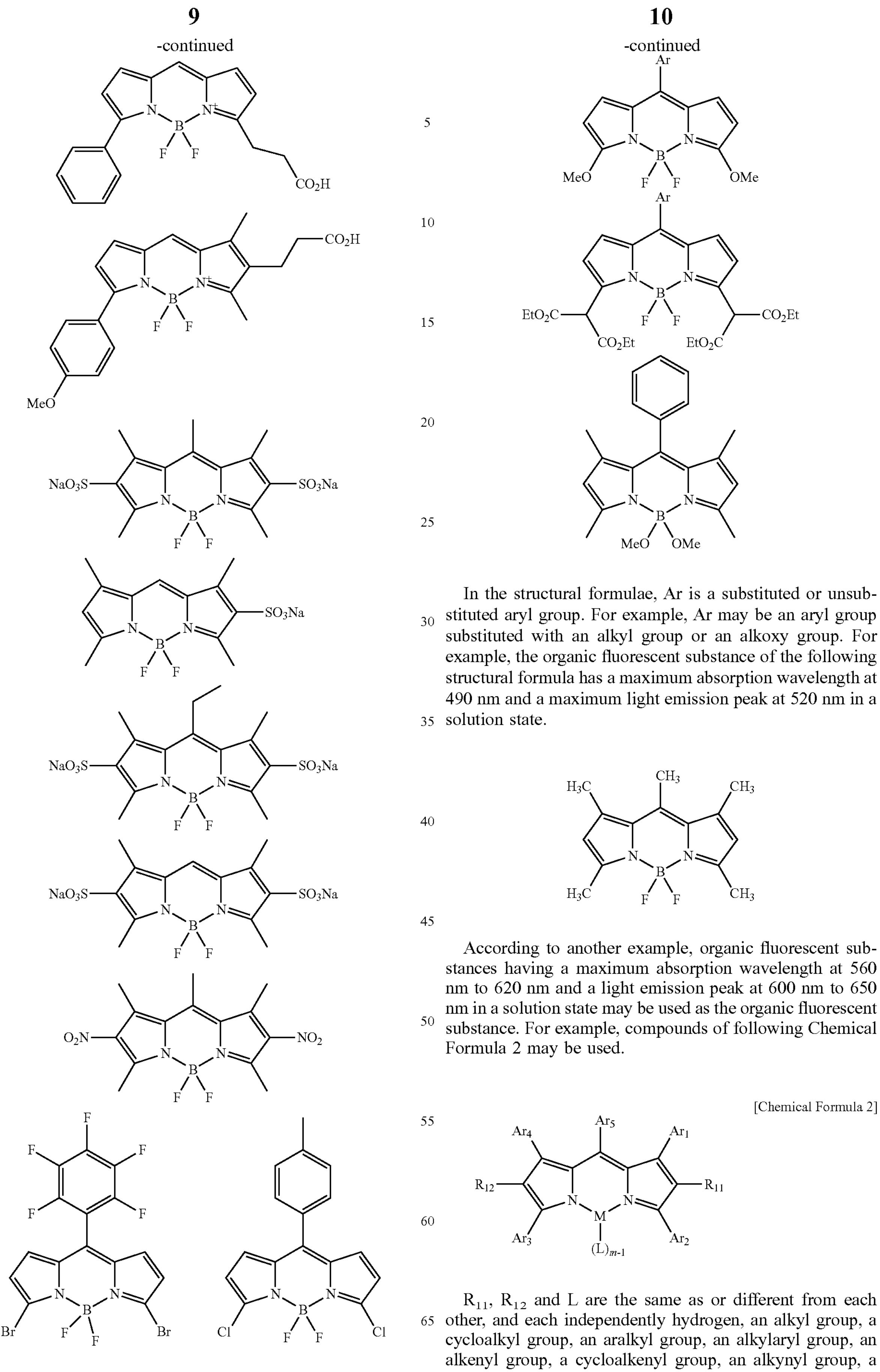

In the structural formulae, Ar is a substituted or unsubstituted aryl group. For example, Ar may be an aryl group substituted with an alkyl group or an alkoxy group. For example, the organic fluorescent substance of the following structural formula has a maximum absorption wavelength at 490 nm and a maximum light emission peak at 520 nm in a solution state.

According to another example, organic fluorescent substances having a maximum absorption wavelength at 560 nm to 620 nm and a light emission peak at 600 nm to 650 nm in a solution state may be used as the organic fluorescent substance. For example, compounds of following Chemical Formula 2 may be used.

[Chemical Formula 2]

$R_{11}$, $R_{12}$ and L are the same as or different from each other, and each independently hydrogen, an alkyl group, a cycloalkyl group, an aralkyl group, an alkylaryl group, an alkenyl group, a cycloalkenyl group, an alkynyl group, a hydroxyl group, a mercapto group, an alkoxy group, an alkoxyaryl group, an alkylthio group, an arylether group, an arylthioether group, an aryl group, a haloaryl group, a heteroring group, halogen, a haloalkyl group, a haloalkenyl group, a haloalkynyl group, a cyano group, an aldehyde group, a carbonyl group, a carboxyl group, an ester group, a carbamoyl group, an amino group, a nitro group, a silyl group or a siloxanyl group, or are linked to adjacent substituents to form a substituted or unsubstituted aromatic or aliphatic hydrocarbon ring or heteroring, M is a metal having a valency of m, and is boron, berylium, magnesium, chromium, iron, nickel, copper, zinc or platinum, $Ar_1$ to $Ar_5$ are the same as or different from each other, and each independently hydrogen; an alkyl group; a haloalkyl group; an alkylaryl group; an amine group; an arylalkenyl group unsubstituted or substituted with an alkoxy group; or an aryl group unsubstituted or substituted with a hydroxyl group, an alkyl group or an alkoxy group.

According to one embodiment, Chemical Formula 2 may be represented by the following structural formulae.

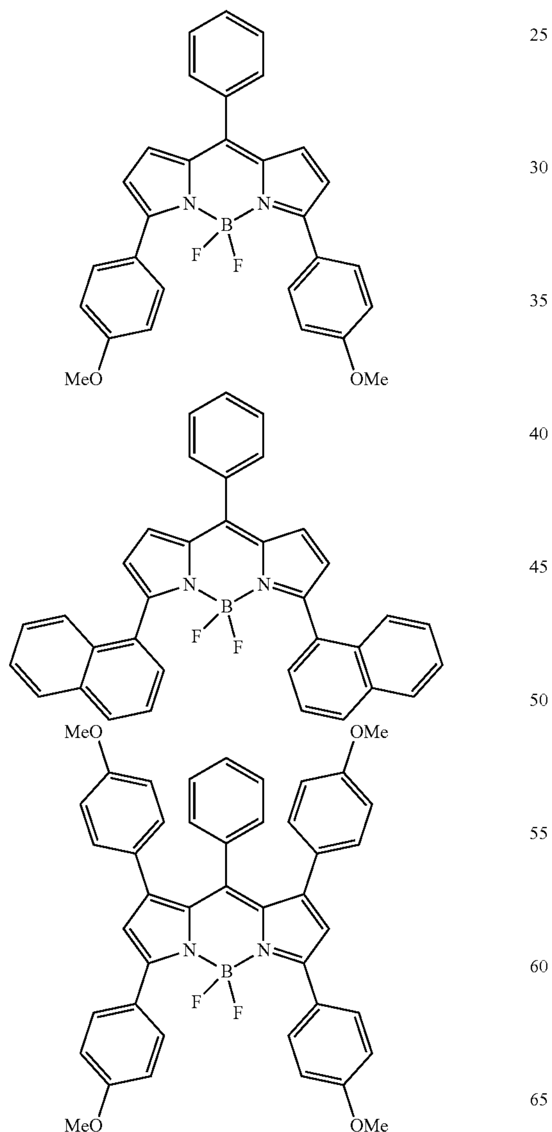

-continued

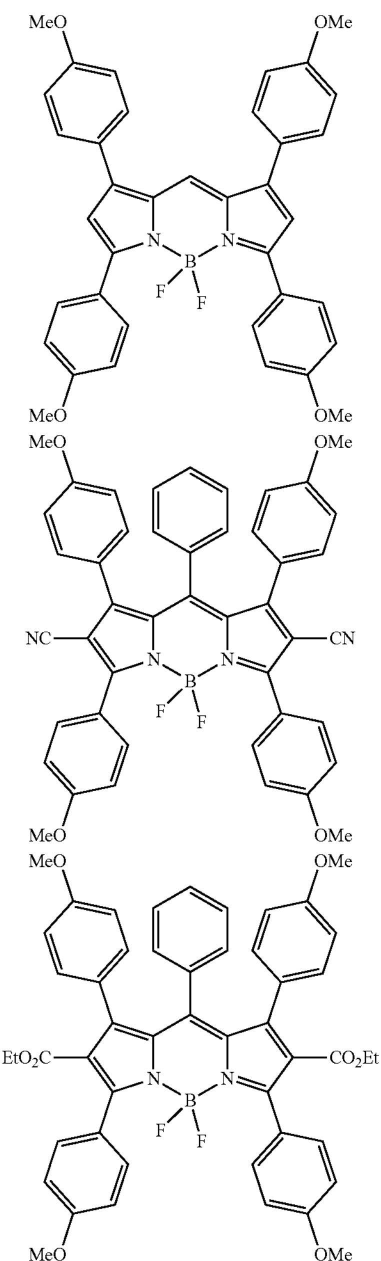

-continued
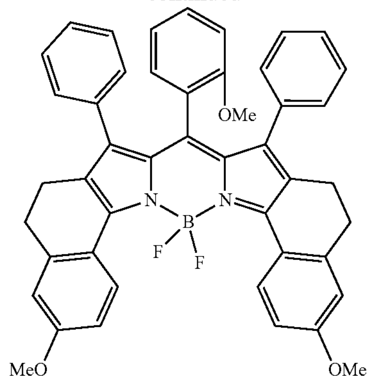
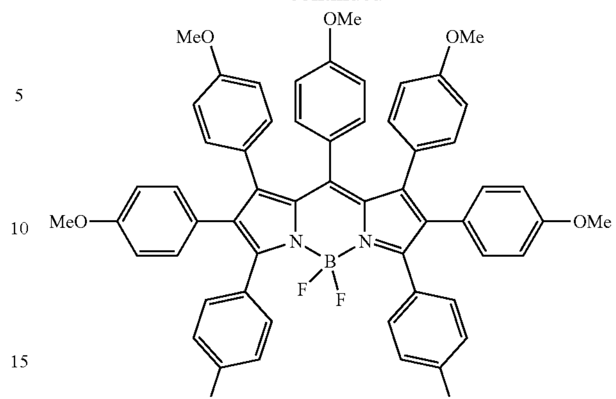
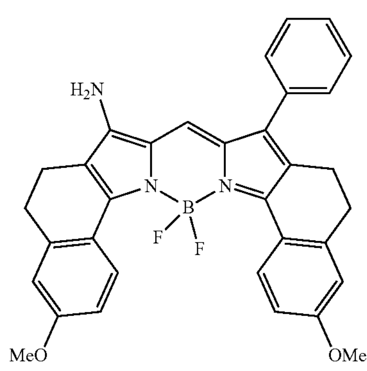
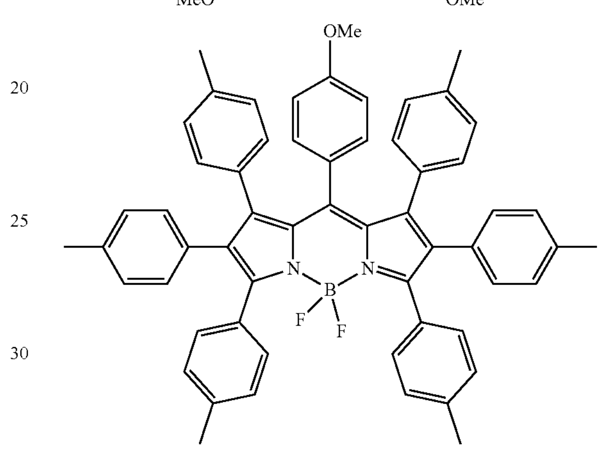
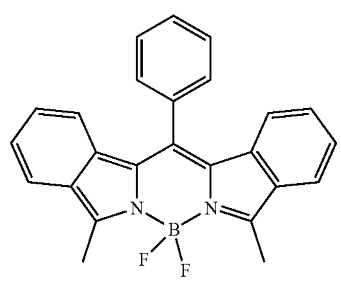
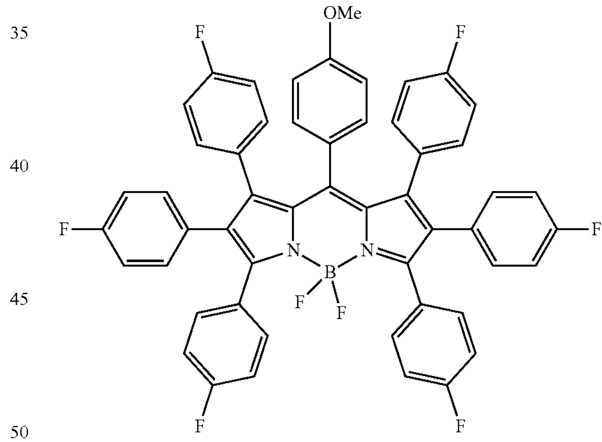
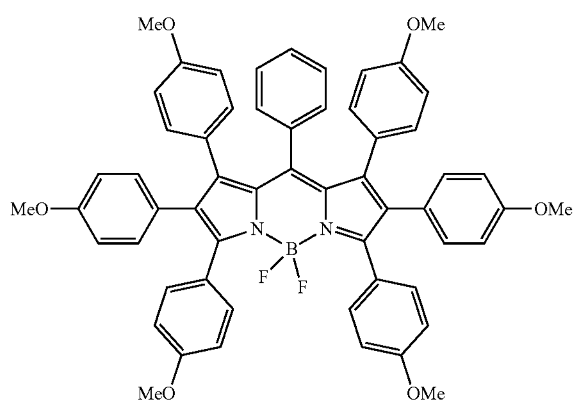
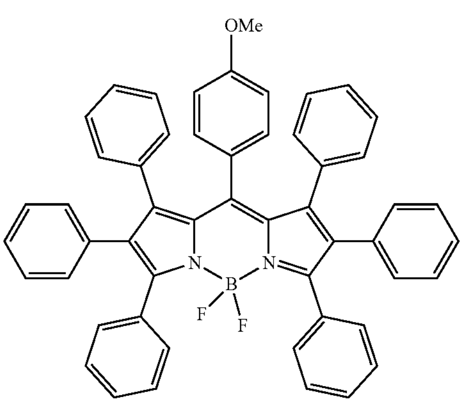

-continued

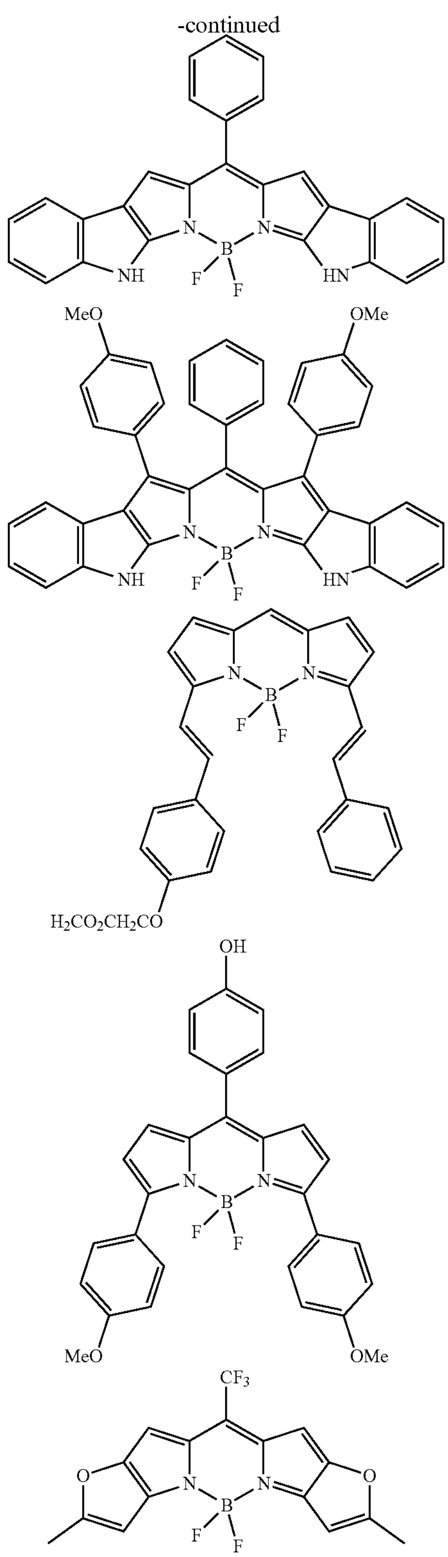

The organic fluorescent substance illustrated above has a light emission peak with a FWHM of 40 nm or less in a solution state, and a light emission peak with a FWHM of approximately 50 nm in a film state.

Content of the organic fluorescent substance may be from 0.005% by weight to 2% by weight based on 100% of the whole color conversion film.

The resin matrix material includes a thermoplastic resin. Specifically, a poly(meth)acryl-based such as polymethyl methacrylate (PMMA), a polycarbonate (PC)-based, a polystyrene (PS)-based, a polyarylene (PAR)-based, a polyurethane (TPU)-based, a styrene-acrylonitrile (SAN)-based, a polyvinylidene fluoride (PVDF)-based, a polyvinyl alcohol (PVA)-based, a modified polyvinylidene fluoride (modified-PVDF)-based and the like may be used as the resin matrix material. One, two or more types of these resins may be included. The resin matrix may be formed with a thermoplastic resin alone, or additives may be added thereto as necessary in a range that does not harm an object of the present invention.

The color conversion film according to the embodiments described above may have a thickness of 2 micrometers to 200 micrometers. Particularly, the color conversion film may exhibit high luminance even with a small thickness of 2 micrometers to 20 micrometers. This is due to the fact that the content of the organic fluorescent substance molecules included in the unit volume is higher compared to quantum dots. For example, a 5 micrometer-thick color conversion film using the organic fluorescent substance content in 0.5 wt % is capable of exhibiting high luminance of 4000 nit or higher based on the luminance of 600 nit of a blue back light unit (blue BLU).

The color conversion film according to the embodiments described above may have a substrate provided on one surface. This substrate may function as a support when preparing the color conversion film. Types of the substrate are not particularly limited, and the material or thickness is not limited as long as it is transparent and is capable of functioning as the support. Herein, transparency means having visible light transmittance of 70% or higher. For example, a PET film may be used as the substrate.

The color conversion film described above may be prepared by coating a resin solution in which the organic fluorescent substance described above is dissolved on a substrate and drying the result, or by extruding and filming the organic fluorescent substance described above together with a resin.

The organic fluorescent substance described above is dissolved in the resin solution, and therefore, the organic fluorescent substance is uniformly distributed in the solution. This is different from a quantum dot film preparation process that requires a separate dispersion process.

Additives may be added to the resin solution as necessary, and for example, a light diffusing agent such as silica, titania, zirconia and alumina powder may be added.

As for the resin solution in which the organic fluorescent substance is dissolved, the preparation method is not particularly limited as long as the organic fluorescent substance and the resin described above are dissolved in the solution.

According to one example, the resin solution in which the organic fluorescent substance is dissolved may be prepared using a method of preparing a first solution by dissolving an organic fluorescent substance in a solvent, preparing a second solution by dissolving a resin in a solvent, and mixing the first solution and the second solution. When mixing the first solution and the second solution, it is preferable that these be uniformly mixed. However, the method is not limited thereto, and a method of simultaneously adding and dissolving an organic fluorescent substance and a resin, a method of dissolving an organic fluorescent substance in a solvent and subsequently adding and dissolving a resin, a method of dissolving a resin in a solvent and then subsequently adding and dissolving an organic fluorescent substance, and the like, may be used.

The organic fluorescent substance included in the solution is the same as described above.

The solvent is not particularly limited as long as it is capable of being removed by drying afterward while having no adverse effects on the coating process. Non-limiting examples of the solvent may include toluene, xylene, acetone, chloroform, various alcohol-based solvents, methylethyl ketone (MEK), methylisobutyl ketone (MIBK), ethyl acetate (EA), butyl acetate, cyclohexanone, propylene glycol methylethyl acetate (PGMEA), dioxane, dimethylformamide (DMF), dimethylacetamide (DMAc), dimethyl sulfoxide (DMSO), N-methyl-pyrrolidone (NMP) and the like, and one type or a mixture of two or more types may be used. When the first solution and the second solution are used, solvents included in each of the solutions may be the same as or different from each other. Even when different types of solvents are used in the first solution and the second solution, these solvents preferably has compatibility so as to be mixed with each other.

The process of coating the resin solution in which the organic fluorescent substance is dissolved on a substrate may use a roll-to-roll process. For example, a process of unwinding a substrate from a substrate-wound roll, coating the resin solution in which the organic fluorescent substance is dissolved on one surface of the substrate, drying the result, and then winding the result again on the roll may be carried out. When a roll-to-roll process is used, viscosity of the resin solution is preferably determined in a range capable of carrying out the process, and for example, may be determined in a range of 200 cps to 2,000 cps.

As the coating method, various known methods may be used, and for example, a die coater may be used, or various bar coating methods such as a comma coater and a reverse comma coater may be used.

After the coating, a drying process is carried out. The drying process may be carried out under a condition required to remove the solvent. For example, a color conversion film including a fluorescent substance having target thickness and concentration may be obtained on a substrate by carrying out the drying in an oven located close to a coater under a condition to sufficiently evaporate a solvent, in a direction of the substrate progressing during the coating process.

When a monomer curable with the resin matrix resin is used as the resin included in the solution, curing, for example, UV curing, may be carried out prior to or at the same time as the drying.

When the organic fluorescent substance is filmed by being extruded with a resin, extrusion methods known in the art may be used, and for example, the color conversion film may be prepared by extruding the organic fluorescent substance with a resin such as a polycarbonate (PC)-based, a poly (meth)acryl-based, a styrene-acrylonitrile (SAN)-based and a polyvinyl alcohol (PVA)-based.

Another embodiment of the present application provides a back light unit including the color conversion film described above. The back light unit may have back light unit constitutions known in the art except for including the color conversion film. For example, FIG. 6 illustrates one example. According to FIG. 6, the color conversion film according to the embodiments described above is provided on a surface of a light guide plate opposite to a surface facing a reflecting plate. FIG. 6 illustrates a constitution including a light source and a reflecting plate surrounding the light source, however, the structure is not limited thereto, and may be modified depending on back light unit structures known in the art. In addition, the light source may use a direct type as well as a side chain type, and a reflecting plate or a reflecting layer may not be included or replaced with other constituents as necessary, and when necessary, additional films such as a light diffusion film, a light concentrating film and a brightness enhancing film may be further provided.

In the constitution of a back light unit such as in FIG. 6, a scattering pattern may be provided as necessary on an upper or lower surface of the light guide plate. Light flowed into the light guide plate has non-uniform light distribution caused by the repetition of optical processes such as reflection, total reflection, refraction and penetration, and the scattering pattern may be used for inducing the non-uniform light distribution to uniform brightness.

According to another embodiment of the present application, the backlight unit includes one or more of the color conversion films described above, and may further include a color conversion film having a light emission peak with a FWHM of greater than 60 nm when irradiating light having a light emission peak at 450 nm, a FWHM of 40 nm or less and monomodal light emission intensity distribution. Herein, at least one of the color conversion films has a maximum light emission wavelength in a 600 nm to 680 nm range when irradiating light having a light emission peak at 450 nm, a FWHM of 40 nm or less and monomodal light emission intensity distribution, and at least one of the color conversion films has a maximum light emission wavelength in a 515 nm to 555 nm range when irradiating light having a light emission peak at 450 nm, a FWHM of 40 nm or less and monomodal light emission intensity distribution. Herein, the two or more color conversion films may be disposed to have a laminated structure.

According to another embodiment of the present application, the backlight unit includes two or more of the color conversion films described above, and at least one of the color conversion films has a maximum light emission wavelength in a 600 nm to 680 nm range when irradiating light having a light emission peak at 450 nm, a FWHM of 40 nm or less and monomodal light emission intensity distribution, and at least one of the color conversion films has a maximum light emission wavelength in a 515 nm to 555 nm range when irradiating light having a light emission peak at 450 nm, a FWHM of 40 nm or less and monomodal light emission intensity distribution. Herein, the two or more color conversion films may be disposed to have a laminated structure. As described above, the two or more color conversion films all have a FWHM of 60 nm or less, and therefore, white color gamut may be more enhanced by using two or more color conversion films having a different maximum light emission wavelength as described above.

In the embodiments, in order to obtain a maximum light emission wavelength in such a range in each of the color conversion films, an organic fluorescent substance having a maximum light emission wavelength in a 600 nm to 680 nm range or an organic fluorescent substance having a maximum light emission wavelength in a 515 nm to 555 nm range may be used, however, two or more types of organic fluorescent substances having a different light emission property may be used, or types of a resin matrix or additives may be used.

According to another embodiment of the present application, a display apparatus including the back light unit described above is provided. The display apparatus is not particularly limited as long as it includes the back light unit described above as a constituent. For example, the display apparatus includes a display module and a back light unit. FIG. 7 illustrates a structure of the display apparatus. However, the structure is not limited thereto, and additional films such as a light diffusion film, a light concentrating film and a brightness enhancing film may be further provided as necessary between the display module and the back light unit.

Hereinafter, the present invention will be described in more detail with reference to examples.

Example 1

A first solution was prepared by dissolving a green organic fluorescent substance of the following structural formula (FWHM=45 nm in film state, Qy=95%, absorption coefficient=80,000 $M^{-1}cm^{-1}$ at maximum absorption wavelength) in a DMF solvent.

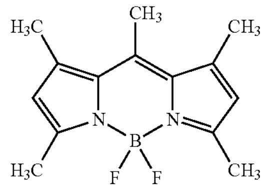

A second solution was prepared by dissolving a PMMA thermoplastic resin in a DMF solvent.

The first solution and the second solution were mixed so that the amount of the organic fluorescent substance became 0.5 parts by weight based on 100 parts by weight of the PMMA, and were uniformly mixed. Solid content in the mixed solution was 20% by weight, and viscosity was 200 cps. This solution was coated on a PET substrate, and the result was dried to prepare a color conversion film.

A luminance spectrum of the prepared color conversion film was measured using a spectroradiometer (TOPCON Corporation SR series). Specifically, the prepared color conversion film was placed on one surface of a light guide plate of a back light unit including an LED blue back light (maximum light emission wavelength 450 nm) and the light guide plate, and after placing a prism sheet and a DBEF film on the color conversion film, a luminance spectrum of the film was measured, and the result is shown in FIG. 1. When measuring the luminance spectrum, an initial value was set so that the brightness of the blue LED light was 600 nit based on without color conversion film. According to FIG. 1, high color gamut was capable of being obtained by using a specific FWHM, specific quantum efficiency and a specific absorption coefficient at maximum absorption wavelength. A unit of the vertical axis in FIG. 1 is $W/sr/m^2$.

Comparative Example 1

Preparation was carried out in the same manner as in Example 1 except that a commercially available perylene series Lumogen Yellow 083 organic fluorescent substance (FWHM=66 nm in film state, Qy=98%, absorption coefficient=100,000 $M^{-1}cm^{-1}$ at maximum absorption wavelength) was used as the organic fluorescent substance. A luminance spectrum of the prepared color conversion film was measured in the same manner as in Example 1, and the result is shown in FIG. 2. The perylene series organic fluorescent substance had a large FWHM at a light emission wavelength, and accordingly, had low color gamut. A unit of the vertical axis in FIG. 2 is $W/sr/m^2$.

Example 2

A color conversion film was prepared in the same manner as in Example 1 except that a red organic fluorescent substance of the following structure (FWHM=49 nm in film state, quantum efficiency 93%, absorption coefficient 185,000 $M^{-1}cm^{-1}$ at maximum absorption wavelength) was used instead of the green organic fluorescent substance used in Example 1 as the organic fluorescent substance.

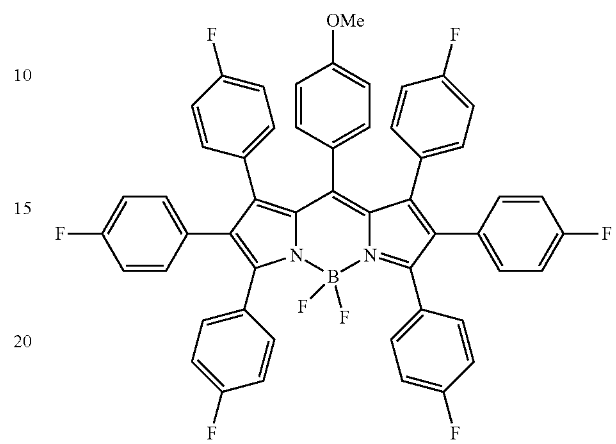

The color conversion film prepared as above and the color conversion film prepared in Example 1 were placed, and a luminance spectrum was measured in the same manner as in Example 1, and the result is shown in FIG. 3. A unit of the vertical axis in FIG. 3 is $W/sr/m^2$.

In addition, color gamut of a spectrum passing through a color filter was each evaluated in CIE 1931 color space and CIE 1976 uniform chromaticity scale (UCS) color space, and the results are shown in the following Table 1.

Example 3

A green color conversion film was prepared in the same manner as in Example 1, except that a green organic fluorescent substance of the following structure (FWHM=40 nm in film state, quantum efficiency 98%, absorption coefficient 75,000 $M^{-1}cm^{-1}$) was used instead of the green organic fluorescent substance used in Example 1. The prepared green color conversion film was laminated with the red color conversion film prepared in Example 2, and color gamut was evaluated in the same manner as in Example 2.

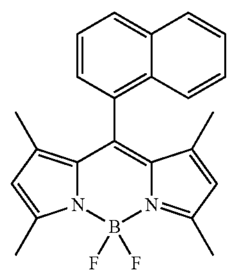

Example 4

A green color conversion film was prepared in the same manner as in Example 1 except that a material of the following structure (FWHM=56 nm in film state, Qy=93%, absorption coefficient=80,000 $M^{-1}cm^{-1}$ at maximum absorption wavelength) was used as the green organic fluorescent substance, water was used as the solvent, and PVA was used as the thermoplastic resin. The prepared green color conversion film was laminated with the red color conversion film prepared in Example 2, and color gamut was evaluated in the same manner as in Example 2.

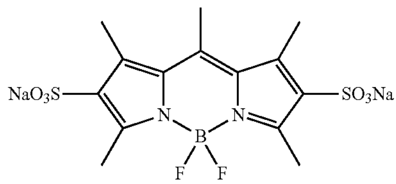

Example 5

A green color conversion film was prepared and evaluated in the same manner as in Example 4 except that a material of the following structure (FWHM=39 nm in film state, Qy=93%, absorption coefficient=80,000 $M^{-1}cm^{-1}$ at maximum absorption wavelength) was used as the green organic fluorescent substance.

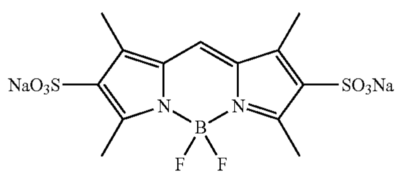

Example 6

A color conversion film was prepared and then evaluated in the same manner as in Example 5 except that Lumogen Yellow 083 (FWHM=66 nm in film state, Qy=98%, absorption coefficient=100,000 $M^{-1}cm^{-1}$ at maximum absorption wavelength) was used as the green organic fluorescent substance, and styrene-acrylonitrile (SAN) was used as the resin matrix material.

Example 7

A color conversion film was prepared and then evaluated in the same manner as in Example 2 except that Lumogen Red 305 (FWHM=81 nm in film state, Qy=98%, absorption coefficient=110,000 $M^{-1}cm^{-1}$ at maximum absorption wavelength) was used as the red organic fluorescent substance, and styrene-acrylonitrile (SAN) was used as the resin matrix material in the green color conversion film.

Comparative Example 2

Preparation was carried out in the same manner as in Example 2 except that Lumogen Yellow 083 (FWHM=66 nm in film state, Qy=98%, absorption coefficient=100,000 $M^{-1}cm^{-1}$ at maximum absorption wavelength) was used as the green organic fluorescent substance, and Lumogen Red 305 (FWHM=81 nm in film state, Qy=98%, absorption coefficient=110,000 $M^{-1}cm^{-1}$ at maximum absorption wavelength) was used as the red organic fluorescent substance.

A luminance spectrum of the prepared color conversion film was measured in the same manner as in Example 1, and the result is shown in FIG. 4. A unit of the vertical axis in FIG. 4 is W/sr/$m^2$.

Wider peak distribution was resulted in a light emission spectrum of FIG. 4 compared to FIG. 3. In addition, color gamut after using a color filter is shown in FIG. 5. The white triangle is a result using the color conversion film of Example 2, and the black dotted triangle is a result using the color conversion film of Comparative Example 2.

Comparative Example 3

A luminance spectrum of a white LED BLU formed with a blue LED and a YAG fluorescent substance was measured, and is shown in FIG. 8. In addition, color gamut after using a color filter is shown in FIG. 5 (black straight line). As in Table 1, it was seen that the narrowest color gamut was resulted. Through the comparison with the result of Comparative Example 3, it can be seen that much wider color gamut is capable of being obtained through the color conversion films of the examples based on x and y and based on u' and v'.

Comparative Example 4

Preparation was carried out in the same manner as in Example 3 except that the used resin was switched to a thermal curable epoxy resin (Bisphenol A-type) instead of the PMMA. The curing condition was curing for 2 hours at 120° C., and leaving the result unattended for 24 hours at room temperature. After preparing the film, light emission intensity greatly decreased, and Qy was too low to obtain preferable white. In this case, color gamut measurement is meaningless. By using a different type of resin from Example 3, quantum efficiency and a FWHM were different from the values of Example 3 as shown in the following Table 1.

Comparative Example 5

A film was prepared in the same manner as in Comparative Example 4 except that the resin matrix was switched to a UV-curable acrylic resin. After preparing the film, light emission intensity greatly decreased, and Qy was too low to obtain preferable white. In this case, color gamut measurement is meaningless.

Color gamut of the films prepared in the examples and the comparative examples is shown in the following Table 1.

TABLE 1

| | Resin Matrix | Green Color Conversion Film FWHM (nm) | Green Color Conversion Film Qy | Red Color Conversion Film FWHM (nm) | Red Color Conversion Film Qy | Based on Color Gamut (x, y) with respect to s-RGB (%) | Based on Color Gamut (u', y') with respect to s-RGB (%) |
|---|---|---|---|---|---|---|---|
| Example 2 | PMMA | 45 | 95 | 49 | 93 | 144 | 139 |
| Example 3 | PMMA | 40 | 98 | 49 | 93 | 146 | 149 |
| Example 4 | PVA | 56 | 93 | 49 | 93 | 145 | 147 |
| Example 5 | PVA | 39 | 93 | 49 | 93 | 149 | 145 |
| Example 6 | SAN | 66 | 98 | 49 | 93 | 139 | 124 |
| Example 7 | SAN | 45 | 95 | 81 | 98 | 133 | 131 |
| Comparative Example 2 | PMMA | 66 | 98 | 81 | 98 | 129 | 112 |
| Comparative Example 3 | None | N.A. | N.A. | N.A. | N.A. | 106 | 106 |
| Comparative Example 4 | Thermal Curable Epoxy Resin | 43 | 22 | 52 | 23 | N.A. | N.A. |
| Comparative Example 5 | UV Curable Acryl Resin | 43 | 46 | 51 | 43 | N.A. | N.A. |

As shown in Examples 6 and 7, color gamut is capable of being enhanced when any one of the green color conversion film and the red color conversion film has a FWHM of 60 nm or less.

The invention claimed is:

1. A color conversion film comprising:

a resin matrix; and an organic fluorescent substance dispersed in the resin matrix, and absorbing blue or green light and emitting light having a wavelength different from the absorbing light, wherein the organic fluorescent substance has the following Chemical Formula 1:

[Chemical Formula 1]

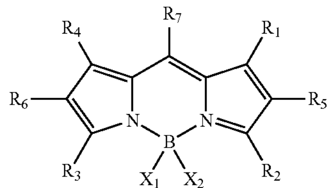

wherein in Chemical Formula 1, $X_1$ and $X_2$ are a fluorine group or an alkoxy group, $R_1$ to $R_4$ are the same as or different from each other, and each independently hydrogen, a halogen group, an alkyl group, an alkoxy group, a carboxyl group-substituted alkyl group, —COOR or a —COOR-substituted alkyl group, and herein, R is an alkyl group, $R_5$ and $R_6$ are the same as or different from each other, and are each independently a cyano group, a nitro group, an alkyl group, a carboxyl group-substituted alkyl group, or —$SO_3Na$, $R_1$ and $R_5$ may be linked to each other to form a substituted or unsubstituted hydrocarbon ring or a substituted or unsubstituted heteroring, and $R_4$ and $R_6$ may be linked to each other to form a substituted or unsubstituted hydrocarbon ring or a substituted or unsubstituted heteroring, and $R_7$ is an alkyl group; or a haloalkyl group, wherein the resin matrix includes a thermoplastic resin comprising one or more selected from the group consisting of a polymethyl methacrylate (PMMA) resin a styrene-acrylonitrile (SAN)-based resin, and a polyvinyl alcohol (PVA)-based resin and wherein the color conversion film has a light emission peak with a full width at half maximum (FWHM) of 60 nm or less, quantum efficiency of 80% or greater and an absorption coefficient of 30,000 $M^{-1}cm^{-1}$ or greater at a maximum absorption wavelength when irradiating light having a light emission peak at 450 nm, a FWHM of 40 nm or less and monomodal light emission intensity distribution.

2. The color conversion film of claim 1, wherein the organic fluorescent substance includes one, two or more types of organic fluorescent substances having a maximum light emission peak in a 510 nm to 680 nm range when irradiating light having a light emission peak at 450 nm, a FWHM of 40 nm or less and monomodal light emission intensity distribution.

3. A method for preparing the color conversion film of claim 1, the method comprising:

coating a thermoplastic resin solution comprising the thermoplastic resin in which the organic fluorescent substance is dissolved on a substrate; and drying the thermoplastic resin solution coated on the substrate.

4. A method for preparing the color conversion film of claim 1, the method comprising extruding the organic fluorescent substance with the thermoplastic resin.

5. A backlight unit comprising one or more color conversion films according to claim 1.

6. The backlight unit of claim 5 comprising two or more color conversion films, wherein at least one color conversion film has a light emission peak with a FWHM of greater than 60 nm when irradiating light having a light emission peak at 450 nm, a FWHM of 40 nm or less and monomodal light emission intensity distribution, and wherein at least one of the color conversion films has a maximum light emission wavelength in a 600 nm to 680 nm range when irradiating light having a light emission peak at 450 nm, a FWHM of 40 nm or less and monomodal light emission intensity distribution, and at least one of the color conversion films has a maximum light emission wavelength in a 515 nm to 555 nm range when irradiating light having a light emission peak at 450 nm, a FWHM of 40 nm or less and monomodal light emission intensity distribution.

7. The backlight unit of claim 5 comprising two or more color conversion films, wherein at least one of the color conversion films has a maximum light emission wavelength in a 600 nm to 680 nm range when irradiating light having a light emission peak at 450 nm, a FWHM of 40 nm or less and monomodal light emission intensity distribution, and at least one of the color conversion films has a maximum light emission wavelength in a 515 nm to 555 nm range when irradiating light having a light emission peak at 450 nm, a FWHM of 40 nm or less and monomodal light emission intensity distribution.

8. A display apparatus comprising the backlight unit of claim 5.

* * * * *